United States Patent [19]
Bouillot et al.

[11] Patent Number: 4,779,269
[45] Date of Patent: Oct. 18, 1988

[54] EFFICIENT TRANSMISSION MECHANISM INTEGRATING DATA AND NON CODED INFORMATION

[75] Inventors: Michel Bouillot, Nice; Jean L. J. Calvignac, LaGaude; Jean M. L. Munier, Cagnes Sur Mer, all of France

[73] Assignee: International Business Machines Corporation, Armonk, N.Y.

[21] Appl. No.: 29,937

[22] Filed: Mar. 24, 1987

[30] Foreign Application Priority Data

Apr. 17, 1986 [EP] European Pat. Off. ........ 86430011.3

[51] Int. Cl.$^4$ .............................................. H04J 3/12
[52] U.S. Cl. .................................................. 370/110.1
[58] Field of Search .................... 370/83, 82, 110.1, 95

[56] References Cited

U.S. PATENT DOCUMENTS

| | | | |
|---|---|---|---|
| 3,549,814 | 12/1970 | Jaeger, Jr. et al. | 370/110.1 |
| 4,476,559 | 10/1984 | Brolin et al. | 370/110.1 |
| 4,577,314 | 3/1986 | Chu et al. | 370/110.1 |
| 4,583,237 | 4/1986 | Haskell | 370/110.1 |

Primary Examiner—Douglas W. Olms
Assistant Examiner—Wellington Chin
Attorney, Agent, or Firm—Edward H. Duffield

[57] ABSTRACT

Method for transporting asynchronous data and synchronous non coded information NCI bits on a common channel operating at $(n+1)/T$ bits per second, in slot of duration T containing $n+1$ bits, the data and NCI portions of the bit stream to be transported being delimited by a flag having a specific pattern which cannot be simulated by the data bits. During the periods where there is an NCI activity, the first n bits of the slot are used for transporting NCI bits and the last bit is used for transporting an additional data bit, if the said first n bits are different from the flag pattern and said last bit is set to a first binary value (0) if said first n bits are similar to the flag pattern. During the periods where there is no NCI activity, data bits are sent in at least one slot delimited by two slots, the first n bits of which are set to the flag pattern and the last bit of which is set to the second binary value (1). A transmitting device and a corresponding receiving device are implemented for generating the bit stream built using the subject method on a communication channel and receiving the so-built bit stream.

9 Claims, 3 Drawing Sheets

PART A

PART B

EFFICIENT TRANSMISSION MECHANISM INTEGRATING DATA AND NON CODED INFORMATION

FIELD OF THE INVENTION

This invention relates to a method for transmitting in a single bit stream mixed coded and non-coded information and a mechanism allowing non-coded information NCI, such as voice or image, and data to be transported between workstations through a communication network using any type of conventional local subscriber telephone link.

BACKGROUND ART

The Integrated Service Data Network (ISDN) basic access provides for a method allowing non-coded information at 64 kilobits per second, data at 64 kilobits per second and signalling at 16 kilobits per second to be exchanged. This requires a 160 kilobits per second rate on the link.

An object of this invention is to provide the same service as the ISDN basic access with a limited bandwidth.

Another object of this invention is to provide a mechanism allowing the transportation of non-coded information NCI and data using any type of already installed local subscriber telephone link.

SUMMARY OF THE INVENTION

The present invention relates to a method for transporting asynchronous data and synchronous non-coded information NCI bits on a common communication channel operating at $(n+1)/T$ bits per second, in slots of duration T containing $n+1$ bits, the data and NCI portions of the bit stream to be transported being delimited by a flag having a specific pattern which cannot be simulated by the data bits.

During the periods where there is an NCI activity, the first n bits of the slot are used for transporting NCI bits and the last bit is used for transporting an additional data bit, if the said first n bits are different from the flag pattern and said last bit is set to a first binary value (0) if said first n bits are similar to the flag pattern.

During the periods where there is no NCI activity, data bits are sent in at least one slot delimited by two slots, the first n bits of which are set to the flag pattern and the last bit of which is set to the second bindary value (1).

In a preferred embodiment of the invention, n is equal to 8, the flag pattern is equal 01111110, and zeroes are inserted after five consecutive ones in the data bits stream to be transported when there is no NCI activity.

A transmitting device and a corresponding receiving device are implemented for generating the bit stream built using the subject method on a communication channel and receiving the so-built bit stream.

DETAILED DESCRIPTION OF THE INVENTION

The mechanism of the invention is based on an arrangement of the NCI/data bit stream and comprises a transmitting device for generating the stream on the communication channel and a receiving device for receiving the stream and retrieving the NCI and data bits.

It allows a communication channel, typically operating at 72 kilobits per second, (i.e. 9 bits in the slot time T equal to 125 microseconds) which corresponds to a conventional carrier offering to be used for the simultaneous transport of both non coded information and data information. The NCI information is transported in a strictly synchronous way, without any delay distortion and without any alteration of its content.

The data and NCI information to be sent or received to/from the communication channel are related to an intelligent workstation able to handle both types of information. As an example, the NCI information consists of 64 kilobits per second PCM coded voice slots given by a standard coder/decoder. As NCI information cannot suffer any delay distortion, as opposed to data information, the data transfers are possibly interrupted by transfers of NCI information.

Thus NCI information is transported on an 8-bit slot basis. When no data activity is detected, a data phase is entered. This data phase will be called the data portion of the stream. The delimitation between the non coded information portions and the data portions is made through a delimitation flag having a specific pattern. In a specific embodiment of the invention, the flag has the same pattern as the HDLC/SDLC flag i.e. 01111110 (7E in hexadecimal).

For every exchange of 8 NCI or data bits, a 9th bit is added. It is used either to discriminate between a NCI/data portion delimitation flag and a NCI pattern identical to he flag or to carry a data bit when no flag in the NCI portion is to be discriminated. This occurs most of the time.

Figure 1:
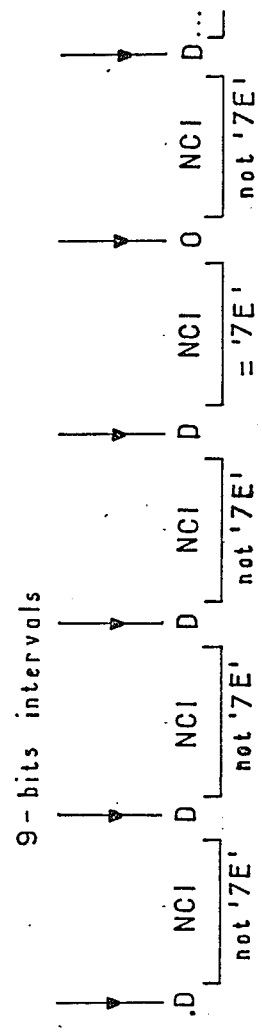
FIG. 1 represents the bit stream generated according to the method of the present invention.
Figure 1:
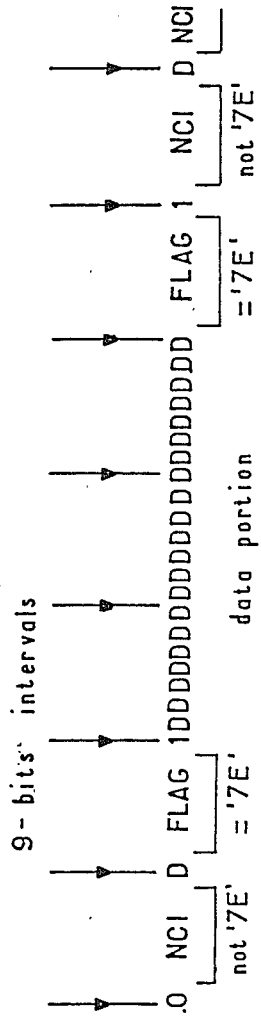

FIG. 1 shows the bit stream transported on the communication channel. Part A of FIG. 1 shows more specifically, a portion of the bit stream corresponding to the transportation of NCI bits.

During the NCI portions, if the slot pattern is similar to a flag, 7E in the preferred embodiment of the invention, the corresponding 9th bit is set to a first binary value, for example 0, otherwise it is used for transporting a data bit, which is part of the data bit stream transported on the communication channel.

The arrows represent the 9-bit intervals and D represents a data bit.

As shown in part B of FIG. 1, during the data portions, if a flag is to be transmitted to indicate the beginning or the end of such a data portion, the corresponding 9th bit is set to the second binary value, i.e. 1 in the specific embodiment of the invention, otherwise it is part of the data stream.

Flag simulations are avoided within the data portions by the conventional zero insertion/deletion technique. This means that in the transmitted data, a zero is inserted after five consecutive ones and in the received data the zeroes following five consecutive ones are deleted. When the data stream is structured in HDLC/SDLC frames it already contains zeroes inserted except when frame delimitation flags, or specific patterns are transmitted. When such data streams are transported according to the method of the invention zeroes are inserted after five consecutive ones of the HDLC/SDLC stream. Flag simulations cannot be avoided in the same way within NCI patterns as NCI content is assumed to be unalterable. This is why, the identification of a NCI pattern similar to a flag is done by setting the 9th bit to 0, as described above.

NCI/data delimitation flags are transmitted with respect to the 9-bit intervals in order to allow synchronous NCI transfers. This is particularly useful when NCI information consists of PCM coded voice information, as channel voice coder/decoders operate in a purely synchronous way.

The synchronization provided by the 9-bit intervals can be easily acquired and maintained due to the fact that a 9th bit always follows a 7E delimitation flag.

At system initialization time, before data or NCI information can be transmitted, consecutive data/NCI delimitation flags i.e 011111101 are sent in order for the receiver to acquire the 9-bit interval synchronization. After that, the data transfers can take place, these data transfers being possibly interrupted by transfers of NCI slots.

Figure 2:
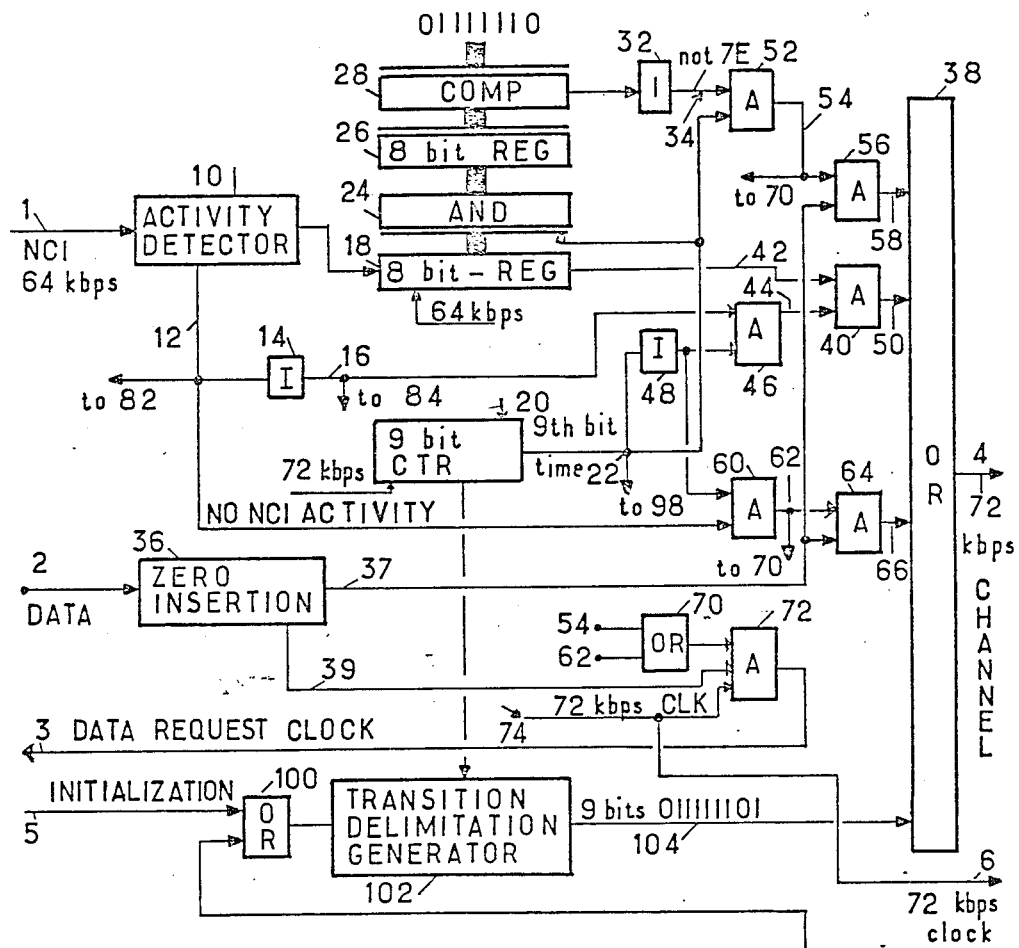
FIG. 2 represents a transmitting device for generating the bit stream to be sent on a communication channel.
Figure 2:
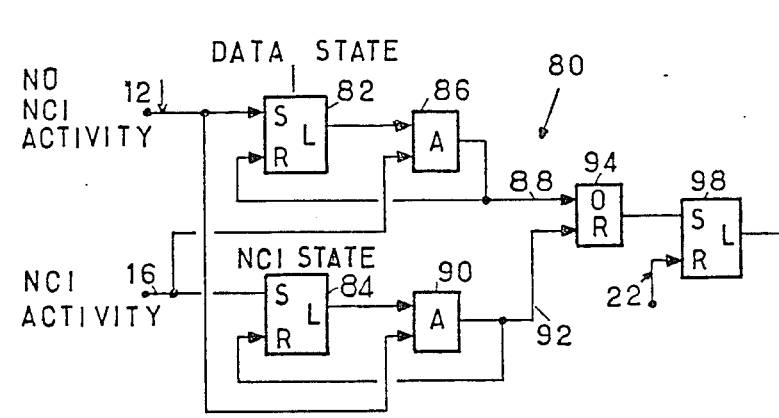

The transmitting device will be described in reference to FIG. 2. It receives the NCI bits to be transmitted from the workstation through line 1 and the data bits to be transmitted from the workstation through line 2. Data bits are taken bit by bit from a data bit queue, at a rate given by a data request clock signal, which is variable depending upon whether the NCI activity. Such a data bit queue is a conventional means of a communication controller. The data request clock signal is generated in the transmitting device and sent to the workstation on line 3. The transmitting device generates the bit stream as shown in FIG. 1, which is to be transmitted on communication channel 4. It comprises an activity detector 10 which receives the non coded information bits NCI and detects whether there is an activity from the NCI part of the workstation. It provides on its output line 12 a signal which is at an UP level when there is no NCI activity. This signal is inverted in inverter 14 which provides a signal on its output line 16 which is at an UP level when there is an NCI activity.

Activity detector performs an integrated measurement of NCI source energy and thus introduces a constant delay to NCI bits. It provides the delayed NCI bits to a 8-bit shift register 18 in which the NCI bits are inputted at the 64 kilobits clock rate.

9-bit counter 20 counts the 72 kilobit clock pulses to provide on its output line 22 a signal which is at an UP level at each 9th bit time. This signal is provided to one input of AND gate assembly 24 which when this signal is UP transfers the content of shift register 18 into register 26. Comparator 28 compares the content of shift register 26 with the delimitation flag pattern 01111110. If an equality is detected comparator 28 provides an output signal in line 30 which is at an UP level indicating that the NCI bit slot is indentical to the delimitation flag. This output signal is inverted in inverter 32 which thus provides on its output line a signal which is at an UP level when the NCI slot is different from the flag.

The data bits are provided by the workstation on line 2. They are handled in the zero insertion circuit 36. The data bits are fetched under control of a data request clock signal sent to the workstation on line 3. The generation of this clock signal will be described later on.

An arrangement of AND gates allow the NCI or data bits to be sent on the communication channel 4 through OR gate 38.

This arrangement comprises AND gates 40, 46 and inverter 48. AND gate 40 receives on one of its inputs 42 the NCI bits which are shifted out of register 18. This gate is conditioned through a signal which is applied on its second input 44 from the output of AND gate 46. AND gate 46 has one of its input which receive the NCI activity signal from line 16 and its second input which receives the signal on line 22 inverted in inverter 48. Thus the NCI bits are provided to one input 50 of OR circuit 48 to be sent onto communication channel 3, when an NCI activity is detected, except during the 9th bit time. During the 9th bit time, the transmission of a NCI bit is inhibited through inverter 48 and AND gate 46.

At that time, if the signal on line 34 is UP indicating that the NCI slot is different from the delimitation flag pattern, AND gate 52 which has its first input connected to line 34 and its second input connected to line 22 is conditioned and provides an UP level signal on its output line 54. Line 54 is connected to one input of AND gate 56 the other input of which is connected to the output line 37 of circuit 36. Thus AND gate 56 provides to input 58 of OR gate 38 at the 9th bit time, either a data bit if the NCI slot is different from the delimitation flag or a zero bit if the NCI slot is identical to the delimitation flag.

When there is no NCI activity, the signal on line 12 is at an UP level. This signal is provided to one input of AND gate 60, the other input of which is connected to the output of inverter 48. The output line 62 of AND gate 60 is connected to one input of AND gate 64, which receives on its second input the data bits from output line 37 of circuit 36. Thus during the first 8-bit part of the slot, 8 data bits are provided to input 66 of OR gate 38 by AND gate 64, and during the 9th bit time, a data bit is sent on input 58 of OR gate 38 by means of AND gate 56.

The data request clock signal on line 3 is generated through a logic circuit comprising OR gate 70 and AND gate 72. The inputs of OR gate 70 are connected to lines 54 and 62 and its output is connected to one input of AND gate 72. The second input of AND gate 72 receives the 72 kilobits per second clock signal on line 74. The third input of AND gate 72 is connected to output line 39 of zero insertion circuit 36 which provides a DOWN level signal when a zero is to be inserted after five consecutive ones of the data stream. Thus the data request clock signal is inhibited during the zero insertion time. Thus the data request clock is active when there is no NCI activity, each time a data bit is to be transmitted and when there is NCI activity, at the 9th bit time, when a data bit is to be transmitted.

It will now be described how the delimitation flag is generated.

Circuit 80 detects the transitions between data and NCI portions so as to generate the flag. It comprises a first latch 82 which is set by signal on line 12 when there is no NCI activity and a second latch 84 which is set by the signal on line 16 when there is an NCI activity. AND gate 86 has one input connected to the output of latch 82 and another input connected to line 16. Thus AND gate 86 provides an UP level output signal on its output line 88 at the transitions from data portions to NCI portions. In the same way, AND gate 90 has one input connected to the output of latch 84 and another input connected to line 12. Thus AND gate 90 provides an UP level signal on its output line 92 at the transitions from NCI portions to data portions. Latches 82 and 84 are reset by the signals on output lines 88 and 92 respectively.

The signals on output lines 88 and 92 are provided to the inputs of OR gate 94, the output signal of which on line 96 sets latch 98. Thus latch 98 is set each time a delimitation flag is to be generated. The output signal from latch 98 is provided to one input of OR gate 100, the other input of which receives an initialization signal on line 5 from the workstation. Flag delimitation generator 102 sends on its output line 104 the flag configuration under control of the output signal from OR gate 100 and the 9 bit counter 20. Line 104 is the fourth input line of OR gate 38. Latch 98 is reset at the 9th bit time by the signal from line 22.

The 72 kilobits per second clock signal is transmitted to the receiving means on line 6.

Thus, the bit stream described in reference to FIG. 1 is sent through OR gate 38 on the communication channel 4.

Figure 3:
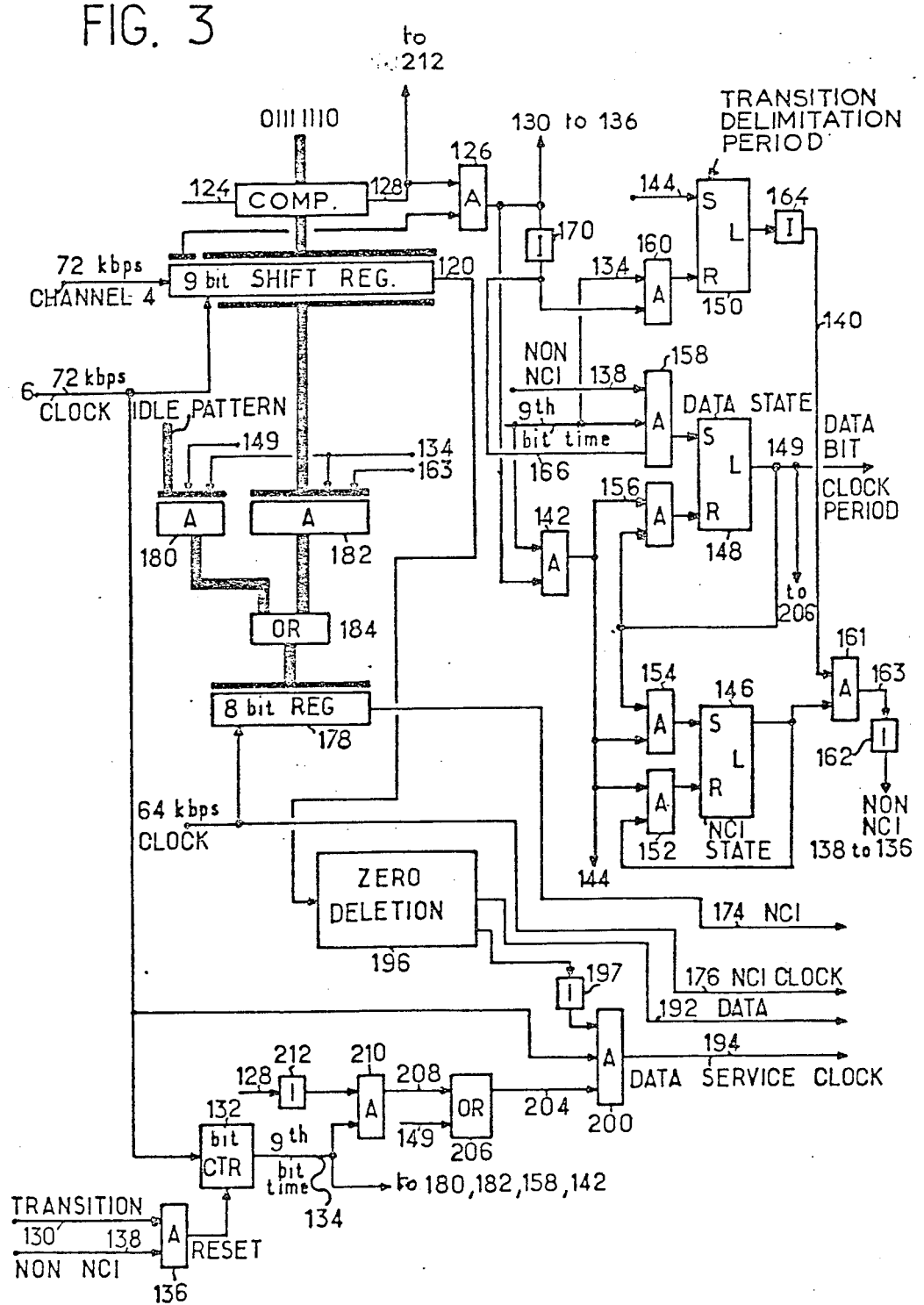
FIG. 3 represents a receiving device for retrieving the data and NCI bits from the received bit stream.

The receiving circuit will now be described in reference to FIG. 3. It comprises an input 9-bit shift register 120 which receives the bit stream from communication channel under control of the 72 kilobits per second clock signal from line 6.

Circuit 122 detects the NCI/data transitions in the received stream. It comprises comparator 124 which compares the eight bits in the right most positions of register 120 with the flag pattern 01111110 and AND gate 126. When an equality is detected by comparator 124, it provides an UP level signal on its output line 128. AND gate 126 has one of its inputs connected to the output line 128 of comparator and another input connected to the left most position of shift register 120. Thus it provides an UP level output signal on its output line 130 when a transition between a data portion and a NCI portion is detected.

Bit counter 132 is connected to clock line 6 and counts the bit clock signal to provide on its output 134, an UP level signal at the 9th bit time. This counter is reset by the output signal of AND gate 136 which is at an UP level when a NCI/data transition is detected by circuit 122 and when a non NCI period is detected. Thus one input of AND gate 136 is connected to line 130 and another input is connected to the output line 138 of circuit 140. Circuit 140 provides a signal on its output 138 indicating whether the received bits are NCI or data bits. The output signal on line 138 is at an UP level when non NCI bits i.e. data bits or flag bits are being received.

It comprises AND gate 142 which has one input connected to line 130 and another input connected to line 134. Thus it provides an UP level output signal on line 144 at the 9th bit time when a data/NCI transition is detected.

Circuit 140 comprises three latches, 146, 148, 150, AND gates 152, 154, 156, 158, 160 and 161, and inverters 162 and 164.

Latch 146 is the NCI state latch. Its set input is connected to the output of AND gate 154, the inputs of which are connected to the output line 144 of AND gate 142 and to the output of data state latch 148. The reset input of latch 146 is connected to the output line of AND gate 152, the inputs of which are connected to the output line 144 of AND gate 142 and to the output of latch 146. The output line of latch 146 is connected to one input of AND gate 161, the other input line of which is connected to the output line of inverter 164. The output line 163 of AND gate 161 is connected to inverter 162 which provides a non NCI signal on line 138.

Latch 148 is the data state latch. Its set input is connected to the output of AND gate 158, the inputs of which are connected to lines 134, 138 and 166. Line 166 receives the signal on line 130 inverted in inverter 170. The reset input of latch 148 is connected to the output of AND gate 156, the inputs of which are connected to line 144 and to the output of latch 148.

Latch 148 provides on its output line 149, a signal which is at an UP level during the data period.

Latch 150 has its set input connected to the output line 144 of AND gate 142 and its reset input connected to the output line of AND gate 160. The input lines of AND gate 160 are connected to the output of inverter 170 and to line 134 so that AND gate 160 provides an UP level signal at the 9th bit clock time when no data/NCI transition is detected.

Circuit 172 provides the NCI bits to the receiving workstation on line 174 at the 64 kilobits per second clock rate. It comprises a shift register 178, the content of which is shifted under the control of the 64 kilobits per second clock signal on line 174. Shift register 178 receives the eight right most bits in register 120 under control of a gating arrangement comprising AND gate assemblies 180 and 182 and OR gate assembly 184.

An idle pattern is loaded into register 178 during the data portions of the stream. Thus AND gate assembly 180 comprises eight AND gates, one input of which receives one bit of the idle pattern. These gates are conditioned at the 9th bit time during the data period, by means of the signals on lines 134 and 149. The outputs of AND gate assembly 180 are connected to one of the inputs of OR gates 184.

AND gate assembly 182 comprises eight AND gates, which are conditioned at the 9th bit time during the NCI portion of the received stream, to transfer the eight right most bits of register 120 into register 178 during the NCI portions. One input of each AND gate in assembly 182 receives one bit of shift register 120 by means of bus 186 and their other inputs are connected to lines 134 and 163.

Circuit 190 provides the data bits to the receiving workstation on line 192 and generates a data service clock signal on line 194. It comprises a zero deletion circuit 196 which receives the bits shifted out shift register 120 from line 198 and deletes each zero following five consecutive ones.

The data service clock signal is generated on output line 194 of AND gate 200. One input of AND gate 200 is connected to 72 kilobits per second clock line 6. The other inputs of AND gate 200 are inhibiting inputs for preventing the data service clock from being generated when a zero is deleted in the data bit stream and when a flag is detected. Thus one of the inhibiting input 202 is connected to the zero deletion circuit 196 through an inverter 197 and the other inhibiting input 204 is connected to the output of OR gate 206. OR gate 206 has one input connected to line 149 and another input connected to the output line 208 of AND gate 210. AND gate 210 has one input connected to line 134 and another input connected to the output line of inverter 212 which inverts the signal from output line 128.

The operation of the receiving circuit will now be described. During the initialization period, data bits are received so that the signal on line 166 is at an UP level and the signal on line 130 is at a DOWN level. AND gate 160 is conditioned at the 9th bit time so that latch 150 is reset and AND gate 161 provides a DOWN level signal on line 163. Signal on line 138 is at an UP level.

Thus at the next 9th bit time, AND gate 158 provides an UP level on its output line which sets data latch 148. The signal on line 149 is at an UP level and AND gate 200 generates the data service clock signal on line 194.

When a data/NCI transition occurs, signal on line 130 becomes UP and signal on line 166 becomes DOWN. AND gate 158 is no more conditioned. AND gate 158 provides an UP level signal at the 9th bit time on line 144. Thus, at that time, AND gates 154 and 156 are conditioned to reset latch 148 and to set latch 146. Latch 150 is also set and the output signal on line 163 is at a DOWN level when the transition is detected until the next 9th bit time. Thus during the 9-bit period following the transition detection, AND gate 161 provides a DOWN level signal which is provided to AND gate 182. This prevents the flag pattern from being transmitted into register 178.

Thus when latch 150 is reset by means of AND gate 160, AND gate 161 is conditioned and AND gate 182 is conditioned at each 9th bit time to transfer the NCI bits on line 174.

Then, at each 9th bit time, if the signal on line 128 is at a DOWN level indicating that the NCI bits are different from the flag, AND gate 208 is conditioned and the data service clock signal is generated, so that the data bit which is received at that time and provided to circuit 196 is received as a data bit of the data stream.

If the signal on line 128 is at an UP level indicating that the NCI bits are identical to the flag, AND gate 208 is not conditioned and the data service clock signal is not generated. When a NCI to data transition occurs, AND gate 152 is conditioned and latch 146 is reset. At the next 9th bit time, latch 148 is set and signal on line 149 is at an UP level, so that AND gate assembly 180 is conditioned to transmit the idle pattern on line 174 and AND gate 200 provides the data service clock signal on line 194, as required.

The proposed mechanism allows an efficient use of a communication channel. The channel bandwidth (e.g. 72 kbps) is used without overhead, except when a '7E' NCI pattern is to be transmitted (1 bit lost), or when a change from NCI to data portion or vice-versa is to be indicated (9 bits lost). If this overhead is neglected, synchronous 64 kbps NCI transmission is possible together with an 8 kbps data transfer, or, when no NCI information is to be transmitted (i.e. no NCI activity detected), the whole 72 kbps bandwidth is available for data transfer.

This simple simultaneous (64 kbps) NCI and data (8 kbps) transmission method is of great interest in case of NCI/data workstations in which NCI (voice) and data can be exchanged simultaneously without any buffering of data to be surimposed as service messages related to NCI exchanges (e.g. exchange of data files under keyboard control at 8 kbps, service data for telephone protocol purposes, such as camp-on, operator intervention issuing messages on display, . . . ). Otherwise, during NCI exchanges, data must be buffered, waiting for an NCI inactivity period; when NCI activity period is terminated, the whole 72 kbps bandwidth is made again available for transmission data at higher rate.

The present proposal has to be compared with ISDN Basic Access which allows:

NCI: 64 kbps
Data: 64 kbps
Signalling/Service messages: 16 kbps
with a total bandwidth of 160 kbps for the link.
The present proposal allows:
NCI: 64 kbps (when NCI activity)
Data: up to 72 kbps
Signalling/Service messages: up to 8 kbps.

This provides the user with the same service, taking advantage of frequent NCI inactivity periods (50 to 70% of the time for voice), and of the large periods of no NCI activity due to the fact that the user is waiting for data such as fac-simile, print-out, screen update, . . .

The main advantage resides in the fact that the total bandwidth needed is reduced from 160 kbps to 72 kbps, thus allowing for such a combined NCI/data transmission to be carried on any conventional type of 2-wire telephone subscriber loop, needing less sophisticated or expensive equipments.

The present invention has been described, assuming that the NCI clock operates at 64 kilobits per second which corresponds to a conventional rate corresponding to 8 bits every T period with T equal to 125 microseconds. However, the concept of the invention may be used with different numbers of bits in a given period T. The number of data bits in T will be equal to n+1 and the link bit rate will be equal to (n+1)/T.

In any case, the main advantages of the present invention is that, the channel bandwidth is used without any overhead except when a NCI pattern identical to the flag is to be transmitted, one bit is lost in this case, or when a change from NCI to data portions is to be indicated, n+1 bits are lost in this case. If this overhead is neglected, synchronous NCI transport at n/T bits per second is possible together with a 1/T bit per second data transfer corresponding to the additional data bit transmitted every NCI slot or when no NCI is transmitted, the whole (n+1)/T bits per second rate is available for data transfer.

Furthermore other flag patterns may be used. For example, delimitation flag could be '7E' to indicate the beginning of a data portion or '7F' to indicate the beginning of an NCI portion (those two patterns are avoided within data stream thanks to the asynchronous zero insertion/deletion technique; NCI '7E' or '7F' patterns are made recognizable thanks to their corresponding 9th bit set to 0).

If Manchester (also called bi-phase) interface coding scheme is used on the communication channel, each 9th bit can be made recognizable by means of a code violation; this can be of great interest to synchronize a workstation, as no minimum flag recurrence is needed to maintain synchronization, i.e. 9-bits interval synchronism is kept even within long NCI or data portions.

We claim:

1. Method for transporting asynchronous data and synchronous non-coded information NCI bits on a common channel operating at (n+1)/T bits per second, in slots of duration T containing n+1 bits, the data and NCI portions of the bit stream to be transported being delimited by a flag having a specific pattern which cannot be simulated by the data bits, characterized in that:

during the periods where there is an NCI activity, the first n bits of the n+1 bit duration slot are used for transporting NCI bits and the last bit of said slot is used for transporting an additional data bit when the said first n bits are different from the flag pattern but said last bit being set to a first binary value (0) when said first n bits of said slot are similar to the flag pattern and during the periods where there is no NCI activity, data bits are sent in at least one n+1 bit duration slot, said slot being delimited by two additional slots, the first n bits of each of which additional slots are set to the flag configuration and the last bit of which is set to a second binary value (1).

2. Method according to claim 1 characterized that:
n is equal to 8
the binary bit flag pattern is equal 01111110, and
binary zero bits are inserted after five consecutive ones in the data bits stream to be transported when there is no NCI activity.

3. Transmitting device for arranging asynchronous data bits and and synchronous NCI bits, which have to be transported on a common channel operating at a clock rate equal to (n+1)/T bits per second, in slots of duration T containing n+1 bits, the data and NCI portions being delimited by a flag having a specific pattern which cannot be simulated by the data bits, characterized in that it comprises:

NCI bit receiving means comprising NCI activity detecting means (10) receiving the NCI bits to be transmitted and generating a signal indicating whether there is an NCI activity or not, and n-bit shifting register means (18) in which the NCI bits are shifted at a clock rate equal to n/T, data receiving means (2,36) receiving the data bits to be transmitted, clock pulse generating means (74) providing a clock pulse stream at the (n+1)/T clock rate, first means (20) responsive to the (n+1)/T clock pulse stream for generating an output signal which is active every (n+1)th bit time, flag detecting means (24, 26, 28) responsive to the n-bit shifting register means and to the active output signal provided by the first means for generating a signal indicating whether the n-bit shifting register means content is identical to the flag pattern or not, second means (46, 48, 40, 38) responsive to the signal indicating that there is an NCI activity for sending the bits which are shifted out of the n-bit shifting register means on the common channel, except when the output signal from the first means is active, third means (32, 52, 56, 38) responsive to the active output signal from the first means and to the output signal from the flag detecting means for sending a data bit on the common channel, when the output signal of the flag detecting means indicates that the n-bit shifting register means content is identical to the flag pattern and for sending a bit at a first binary value (0) when the flag detecting means indicate that the n-bit shifting register means content is different from the flag pattern, transition indicating means (80) responsive to the output signal of the NCI activity detecting means for generating an output signal which is active when a transition between NCI and data portions is detected, transition delimitation generating means (102, 38) responsive to the output signal of the transition indicating means for generating on the common channel a (n+1)-bit pattern in which the n first bits are set to the flag pattern and the last bit is set to the second binary value (1), data sending means (36, 60, 64, 70, 72, 38) responsive to the output signal of the NCI activity detecting means, indicating that there is no NCI activity for sending data bits on the common channel.

4. Transmitting means according to claim 3, characterized in that the data sending means comprises:

data request clock generating means (70, 72) which are active during the last bit of the (n+1) bit slot when the NCI activity detecting means indicates that there is an NCI activity and the flag detecting means provides an inactive output signal, or when the NCI activity detecting means indicates that here is no NCI activity, for generating a data request clock signal which causes the (n+1)/T clock signal to be active for providing the data bits on the common channel.

5. Transmitting means according to claim 3 or 4, characterized in that n is equal to 8 and the flag pattern is 01111110.

6. Transmitting means according to claim 5, characterized in that the data sending means comprises:

zero inserting means (36) receiving the data bits to be transmitted and inserting a 0 after five consecutive ones.

7. Receiving means for receiving a bit stream generated on a common channel by the transmitting means according to claim 3, characterized in that it comprises:

(n+1)/T bit clock signal generating means (6) generating a clock signal at the (n+1)/T bit clock rate, (n+1)-bit shifting register input means (120) having (n+1) positions in which the bit stream received from the common channel (4) are inputted at the (n+1)/T bit clock rate, flag detecting means (124), responsive to the bits in the n-right most position of the shifting register input means for generating a signal indicating whether said n-bits are identical to the flag pattern or not, transition delimitation detecting means (126) responsive to the output signal of the flag detecting means and to the bit in the left most position of the shifting register input means for generating an active output signal indicating that a transition between data and NCI portions has been detected, first means (132) responsive to the clock signal for generating an output signal which is active every (n+1)th clock pulse, second means (140) responsive to the output signal from the transition delimitation detecting means, to the output signal from the first means for generating a signal indicating that the bits in the n right most positions of the shifting register input means are data bits, NCI bits or flag bits, third means (172, 190) responsive to the signal generated by the first and second means for sending the n right most bits of the shifting register input means to a NCI bit receiving means (178, 174) when the said signal indicates that said bits are NCI bits, for sending the (n+1) bits of the shifting register means to a data receiving means (192, 190) when said signal indicates that the n right most bits are data bits, and for sending the left most bit in the shifting register means to the data receiving means when the signal generated by the second means indicates that the n right most bits are NCI bits and the flag detecting means (124) indicates that the said NCI bits are different from the flag pattern.

8. Receiving means according to claim 7 characterized in that the second means have two output lines (149, 163), and generate on the first output line (149) a signal which is active during the data portions of the received bit stream and on the second output (163) a signal which is active during the NCI portions of the received bit stream.

9. Receiving means according to claim 8, characterized in that the third means comprises:

gating means (180, 182) responsive to the signal on the second output from the second means and to the signal generated by the first means for transferring the n right most bits in the shifting register means serially on a NCI output line (174), data receiving means (196, 200, 206, 210, 212) responsive to the signal on the first output from the second means to the signal generated by the first means, and to the output signal of the flag detecting means indicating that the n right most bits in the shifting register means are different from the flag pattern for providing the data bits from the shifting register means serially to a data line (192) when the signal on said first output of the second means indicates a data state period or for providing the additional (n+1)th data bit following NCI bits different from the flag pattern.

* * * * *